Nov. 5, 1940.                H. PETZOLDT                 2,220,659
                        IRRIGATION CHECKING IMPLEMENT
                          Filed July 14, 1939        3 Sheets-Sheet 1
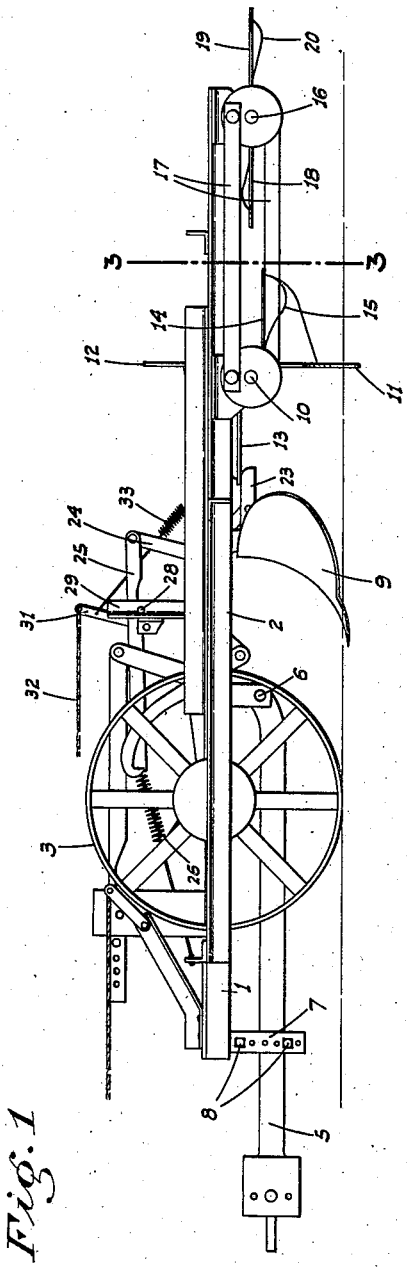
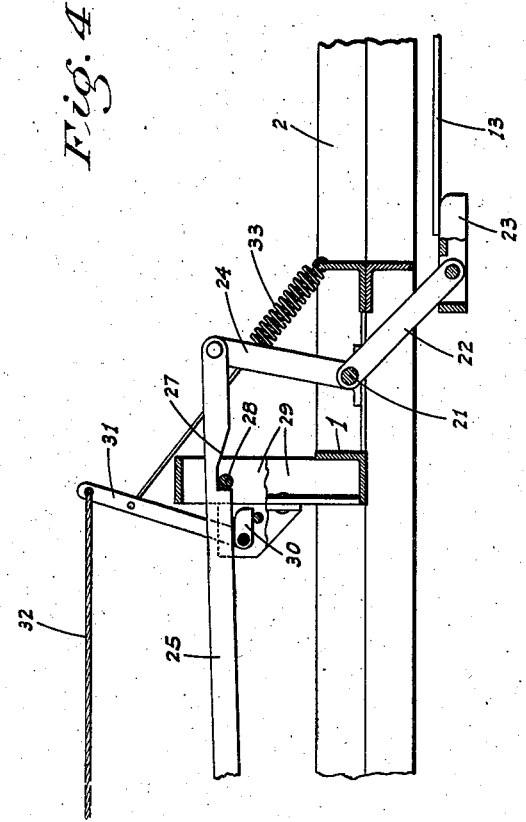
INVENTOR
*Hugo Petzoldt*
BY
ATTORNEY Nov. 5, 1940.　　　　H. PETZOLDT　　　　2,220,659
IRRIGATION CHECKING IMPLEMENT
Filed July 14, 1939　　　3 Sheets-Sheet 2

INVENTOR
*Hugo Petzoldt*

BY
ATTORNEY

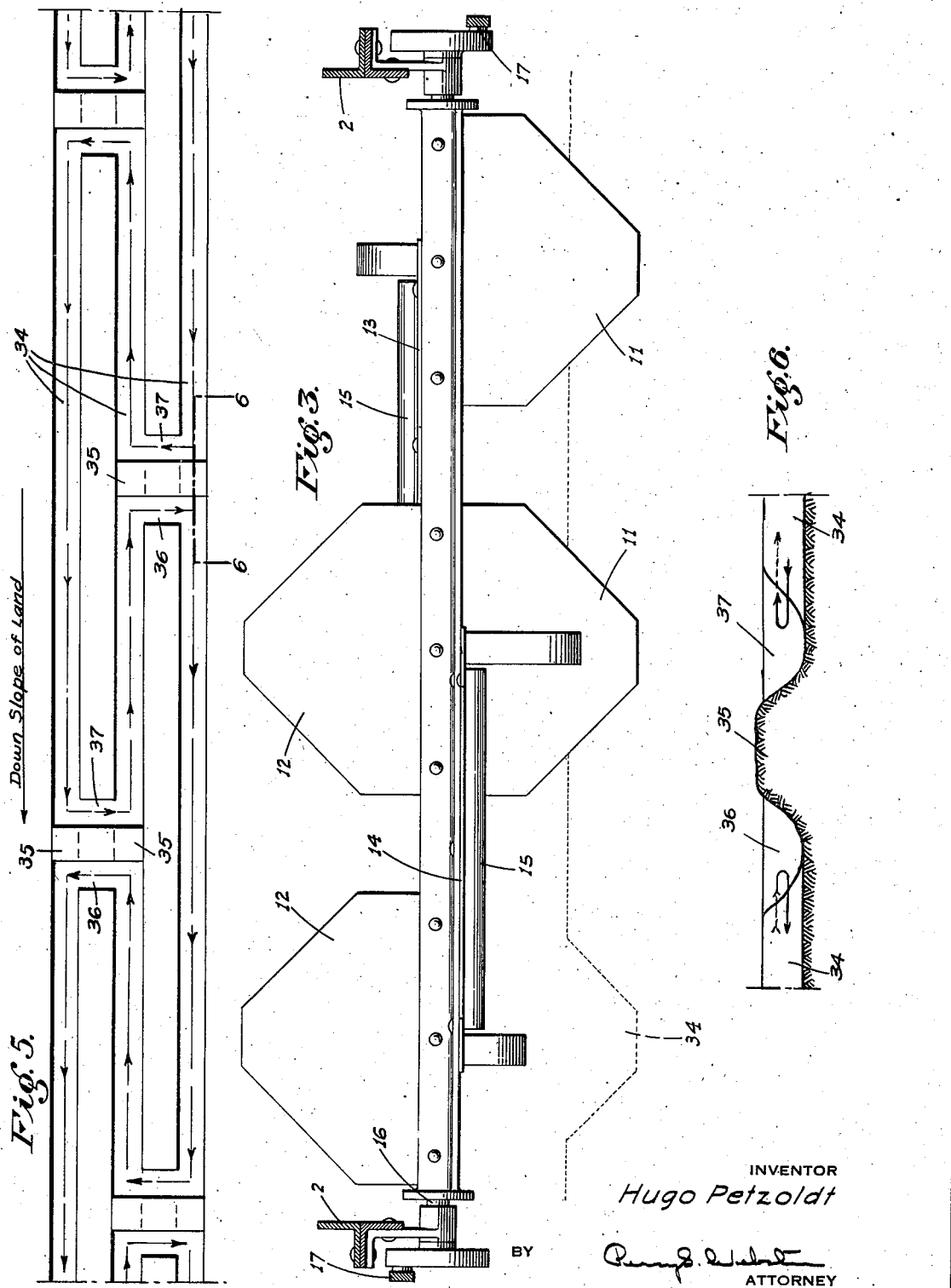

Patented Nov. 5, 1940

2,220,659

UNITED STATES PATENT OFFICE 2,220,659

IRRIGATION CHECKING IMPLEMENT

Hugo Petzoldt, Sanger, Calif., assignor of one-half to Earl F. Hultquist, Reedley, Calif.

Application July 14, 1939, Serial No. 284,486

14 Claims. (Cl. 97—55)

This invention relates generally to an agricultural implement, and in particular the invention pertains to an improved irrigation checking implement.

The surface irrigation of land which is hilly or slopes presents a serious problem as the water runs off too rapidly and before it has an opportunity to penetrate into the soil as is desirable. In vineyards and orchards, for example, the irrigation furrows running downhill between the rows will not retain the water for a sufficient period unless checks are formed in such furrows and which checks act as dams to hold back the water where necessary and for the proper length of time. This checking is generally done by hand and in certain instances a plurality of parallel furrows are checked and are also connected by a series of cross canals in order to cause the water to recurringly "back up" along the furrows for a certain distance before flowing across to an adjacent furrow and thence downhill again until it reaches another check and cross furrow.

The principal object of the present invention is to provide an implement including, in unique combination, means to form a plurality of parallel irrigating furrows, and means to intermittently check certain of the furrows in alternating staggered relation and to form cross passages or canals between adjacent furrows whereby the irrigating water fed into one of such furrows at the hill top will follow a circuitous, and at intervals a "backing up" course in order to assure proper permeation of the water into the earth and to prevent undue running off.

An additional object of the invention is to provide an implement of the class described which is arranged to form clean longitudinal furrows and cross canals for the water flow.

A further object is to provide a simple and effective control means, operable at the option of the operator, whereby the spacing of the alternating checks along the furrows may be governed to suit individual conditions.

These objects I accomplish by means of such structure and relative arrangement of parts as will fully appear by a perusal of the following specification and claims.

In the drawings similar characters of reference indicate corresponding parts in the several views:

Figure 1 is a side elevation of the machine.

Figure 3 is an enlarged transverse section on line 3—3 of Fig. 1.

Figure 4 is a fragmentary longitudinal section showing the check-plate holding and release means.

Figure 5 is a diagrammatic plan illustrating the work done by the machine.

Figure 6 is a sectional elevation on line 6—6 of Fig. 5.

Figure 2:
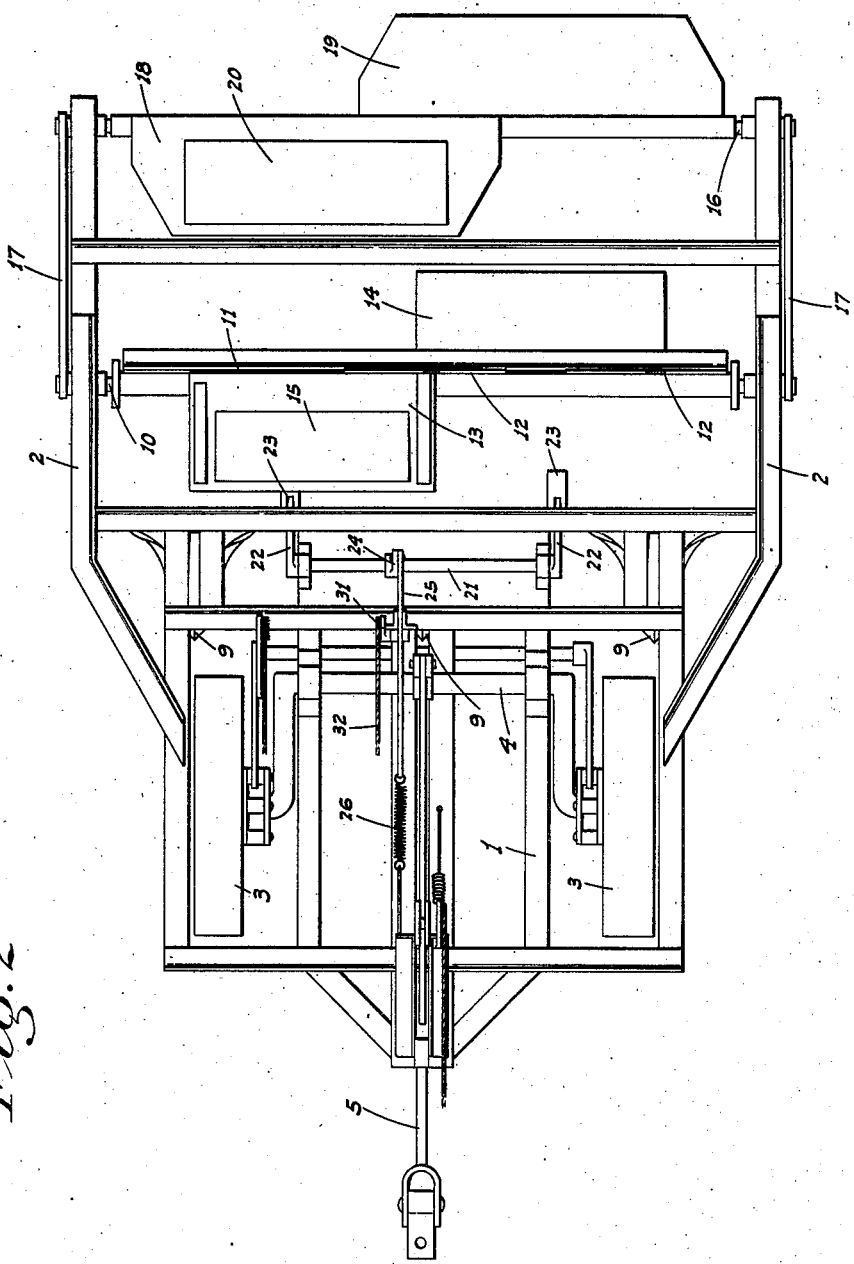
Figure 2 is a top plan view of the same.

Referring now more particularly to the characters of reference on the drawings, the machine comprises a horizontal frame structure 1 which includes side beam units 2. Ground engaging wheels 3 are disposed adjacent the forward end of the frame just inside beams 2 and are mounted on a crank axle unit 4 journaled on the frame rearwardly of the wheel center line so that rotation of the axle will relatively raise and lower the wheels. The axle is moved to and held in any desired set position by suitable actuating and holding means which may be of conventional form and which in itself forms no part of this invention.

A draft bar or tongue 5, adapted at its forward end for supporting connection with a tractor, extends centrally under the frame some distance from ahead of its front end, and at its rear end is pivoted on the frame in a plane adjacent and below the axle as at 6. At the front end of the frame, the tongue cooperates with a depending guide plate 7 having adjustable stop pins 8 above and below the tongue to limit the vertical swinging of the frame relative to the tongue.

This particular mounting of the tongue insures that the pull will be transmitted to the frame at such a point as to force the ground working elements into the ground, and the adjustability of the front end of the tongue allows for connection with tractors having different drawbar levels without disturbing this desired holddown of the implements.

Mounted on and depending from the frame behind the wheels are three transversely and evenly spaced furrow openers or plows 9. Turnably mounted on and extending between the side beams 2 rearwardly of the plows is a transverse shaft 10. Projecting substantially radially of and rigid with the shaft are transversely spaced furrow shaping plates 11, disposed in alinement with one outside plow and the central plow. Also rigid with the shaft and disposed in diametrally opposed relation with the plates 10 are other similar plates 12, disposed in alinement with the central plow and the other outside plow.

Rigid with and projecting from shaft 10 at right angles to plates 11 is a check forming plate 13 extending along the shaft substantially from center to center of plates 11. Also projecting from said shaft in diametrally opposed relation to plate 13 is another check forming plate 14. This plate extends along the shaft substantially from center to center of plates 12. The back side of plates 13 and 14, relative to the direction of rotation of the shaft, carry rounded dirt compacting shoes 15. The radial extent of the shaping and checking plates is such that when depending vertically, they will engage the ground to substantially the same depth as the furrow openers 9.

Journaled on the side beams 2 rearwardly of shaft 10 is another transverse shaft 16. This is coupled to the shaft 10 in driving relationship for rotation therewith at the same speed by connecting rods 17. The shaft 16 carries a pair of by-pass forming plates 18 and 19 disposed in diametrally opposed relation. The plate 18 is parallel to plate 13 and faces in the same direction, while the plate 19 is parallel to plate 14 and faces in a corresponding direction. Ground compacting shoes 20 are mounted on the plates 18 and 19 on their back side. The length of plates 18 and 19 at their ground engaging end is somewhat greater than that of plates 13 and 14, so as to engage the ground between opposite sides of adjacent furrows.

When the machine is operating, either the plates 11 or 12 are dragging in their furrows, tending to rotate shaft 10. In order to prevent rotation of the shaft until it is desired to form a check, in the manner hereinafter described, I provide a holding means constructed as follows: Turnably mounted on the frame structure ahead of the path of rotation of the furrow shaping and check forming plates is a cross shaft 21. A pair of rearwardly angled arms 22 depend from this shaft in planes intermediate the ends of plates 13 and 14, and centrally between the pairs of plates 11 and 12. Lugs 23 are pivoted on the lower ends of arms 22 and normally project into the path of rotation of plates 13 and 14. The lugs are mounted on the arms so that while they are free to yield upwardly, they cannot break down beyond a horizontal plate engaging position. The lugs are positioned so that when engaging a plate, the furrow shaping plates will be substantially vertical.

The shaft 21 is normally held against rotation from the position necessary to maintain the lugs in a plate engaging position, by means of an upstanding arm 24 thereon. This arm is pivotally connected to a forwardly extending bar 25 which is normally pulled forward and downwardly by a spring 26. Intermediate its ends, the bar is formed on its lower edge with a rearwardly facing notch 27 normally engaged by a stop pin 28 mounted on and between bar guide members 29 upstanding from the frame 1.

A rotary cam 30 is mounted in connection with members 29 ahead of pin 28 and engages the underside of bar 25.

An arm 31 extends upwardly from the cam and is connected to a pull cord 32 whereby the arm may be manipulated from the tractor. The cam is arranged so as to lift bar 25 with a forward movement of arm 31 sufficient to disengage the pin 28 from the holding notch 27. A spring 33 is applied to arm 31 to pull the same rearwardly and thus normally maintain the cam in its lowered position.

In operation, the wheels are set so that the plows will dig to the desired depth to form the three parallel furrows or shallow ditches 34. At the same time, the shaping plates 11 (as here shown) are engaged with two of the furrows directly behind the plows. These plates actually have three functions. In the first place, they shape the furrows. In doing so, they push a certain amount of dirt ahead in the furrows so that dams 35 will be formed and left in the furrows if the advancing movement of the plates is halted. The ground thus offering a resistance to the forward movement of the plates, the latter tend to rotate the shaft 10 as well as shaft 16 by reason of the rods 17 connecting the same. While these shaping, dam forming and shaft rotating plates are thus engaged in the furrows, the shaft 10 is held from rotation by plate 13 engaging one of the lugs 23 as previously explained. When it is desired to form a check across these two furrows, the operator pulls cord 32. The bar 25 is thus released from the catch pin and is free to slide rearwardly. The plate 13 bearing down on the lug, turns the shaft 21 so that the arms 22 and lugs are lowered until the plate clears the same. As soon as this occurs, the shaft 21 and parts connected thereto return to their normal position due to the action of spring 26; the cord 32 being at once released as soon as it is pulled so that the catch pin 28 may re-engage the bar notch.

The plates 11 thus move away from the dams formed thereby, leaving them in the furrows. As the plates 11 thus swing up and away from the dams, the plate 13 descends and cuts into and through the ground transversely of the furrows immediately ahead of the dams. This action not only causes a lateral by-pass passage 36 to be formed between the two furrows now being worked on, but the dirt displaced by the formation of the passage is piled up in line with and between the dams 35 so that a continuous check is formed between the opposite sides of the two furrows, as indicated in Fig. 5.

Simultaneous with the functioning of the plate 13, the plate 18 is functioning to cut a lateral passage 37 between the furrows behind the dam or check. As the plates 13 and 18 swing up after engaging the dirt, the shoes on their back faces aid in packing or compacting the check, since it must be remembered that while the plates are thus turning about their pivotal shafts, the machine continues to advance.

While the plates 13 and 18 are engaged with the ground, they also function to rotate their shafts, since the initial driving plates 11 have left the ground. The said plates 13 and 18 will continue to thus function until the opposed furrow shaping plates 12 take hold. The plate 14 will then be disposed above and moving down onto the corresponding lug 23 to be held thereby until it is desired to form a check across the corresponding two furrows. This is of course accomplished by another pull on the cord 32, causing the check and lateral passages to be made by plates 14 and 19 in the same manner as described in connection with plates 13 and 18.

The distance between checks is under control of the operator, and is governed by the degree of slope of the land being irrigated. In any event however, it will be seen that the checks will always alternate between the central furrow and one or the other of the outer furrows. As a result, water admitted to one outer furrow will flow down the same to the adjacent check, then into and up the central furrow to the adjacent check, then over to and down the other outer furrow to the next check, and then into and up the central furrow to the first named check, and then over to and down the first named outer furrow, and so on as plainly shown in Fig. 5. It makes no difference of course whether the machine travels up or down the slope when forming the water courses and checks.

The formation of checked irrigation courses or furrows for sloping land, to properly retard the downhill flow of the water, is thus greatly facilitated over present procedure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An irrigation checking implement comprising a frame adapted for movement along the ground, a furrow forming element on the frame, a plate behind the element adapted and shaped to depend into the furrow and to engage and push dirt therein ahead with the advancing movement of the implement, a rotary transverse shaft mounted on the frame and from which the plate projects whereby the pressure of the dirt against the plate will tend to rotate the shaft and swing the plate out of the furrow and holding means releasable at will to prevent rotation of the shaft; said holding means comprising a member rigid with and projecting from the shaft at an angle to the plate, a lug normally projecting into the path of rotation of the member and positioned to engage the same when the plate is in a substantially vertical depending position, means mounting the lug for movement clear of said path, and releasable catch means normally preventing movement of the lug mounting means.

2. An irrigation checking implement comprising a frame adapted for movement along the ground, a furrow forming element on the frame, a plate behind the element adapted and shaped to depend into the furrow and to engage and push dirt therein ahead with the advancing movement of the implement, a rotary transverse shaft mounted on the frame and from which the plate projects whereby the pressure of the dirt against the plate will tend to rotate the shaft and swing the plate out of the furrow and holding means releasable at will to prevent rotation of the shaft; said holding means comprising a member rigid with and projecting from the shaft at a forward angle to the plate when the latter is in a depending and substantially vertical position, a lug projecting into the path of rotation of and below the member in position to be engaged thereby when the plate is in said position, a transverse shaft turnably mounted on the frame ahead of the member and lug, an arm projecting rearwardly from said shaft on which the lug is mounted and releasable means applied to the shaft to prevent rotation of the same in a direction to swing the arm down.

3. An irrigation checking implement comprising a frame adapted for movement along the ground, a furrow forming element on the frame, a plate behind the element adapted and shaped to depend into the furrow and to engage and push dirt therein ahead with the advancing movement of the implement, a rotary transverse shaft mounted on the frame and from which the plate projects whereby the pressure of the dirt against the plate will tend to rotate the shaft and swing the plate out of the furrow and holding means releasable at will to prevent rotation of the shaft; said holding means comprising a member rigid with and projecting from the shaft at a forward angle to the plate when the latter is in a depending and substantially vertical position, a lug projecting into the path of rotation of and below the member in position to be engaged thereby when the plate is in said position, a transverse shaft turnably mounted on the frame ahead of the member and lug, an arm projecting rearwardly from said shaft on which the lug is mounted, another arm projecting upwardly from the shaft, a substantially horizontal bar pivoted on the upper end of said other arm having a catch notch in its lower edge, a stop fixed on the frame and engaging said notch means applied to the under side of the bar to lift the same clear of the stop whereby the bar may move lengthwise and allow the shaft to rotate and the lug supporting arm to be lowered and means tending to return the bar to a stop engaging position.

4. An irrigation checking implement comprising a frame adapted for movement along the ground, a furrow forming element on the frame, a plate behind the element adapted and shaped to depend into the furrow and to engage and push dirt therein ahead with the advancing movement of the implement, a rotary transverse shaft mounted on the frame and from which the plate projects whereby the pressure of the dirt against the plate will tend to rotate the shaft and swing the plate out of the furrow and holding means releasable at will to prevent rotation of the shaft; said holding means comprising a member rigid with and projecting from the shaft at a forward angle to the plate when the latter is in a depending and substantially vertical position, a lug projecting into the path of rotation of and below the member in position to be engaged thereby when the plate is in said position, means mounting the lug in connection with the frame for movement clear of the path of said member, releasable means normally preventing such movement of the lug and means acting on the lug mounting means tending to return the lug to a member engaging position after said lug has been moved clear of the path of the member and the latter has swung downwardly and clear of the lug.

5. An irrigation checking implement comprising a frame adapted for movement along the ground, elements on the frame to form a pair of parallel furrows with the advancing movement of the frame, means functioning with such advancing movement and operable at will to form checks in the furrows at selected intervals in the length thereof, and instrumentalities functioning in synchronized relation and substantially simultaneous with the forming of the checks to cut lateral water passages between the furrows both ahead of and behind the checks.

6. An irrigation checking implement comprising a frame adapted for movement along the ground, elements on the frame to form a pair of parallel furrows with the advancing movement of the frame, longitudinally spaced front and rear rotary transverse shafts mounted on the frame rearwardly of the elements, means coupling the shafts for rotation at the same speed, plates projecting from the front shaft to drag in the furrows and push dirt ahead therein to form checks when the plates leave the furrows, releasable means preventing rotation of the shafts from the position occupied when said plates are dragging in the furrows, another plate projecting forwardly from the front shaft relative to the furrow engaging position of the first named plates and adapted to cut a lateral channel between the furrows ahead of the checks when the shaft is released to rotate and with the advancing movement of the implement and a third plate projecting from the rear shaft parallel to and in the same direction as said other plate and positioned and adapted to cut a lateral channel between the furrows rearwardly of the checks.

7. A structure as in claim 6, with ground compacting shoes on the back sides of said other and third plates.

8. An irrigation checking implement comprising a frame adapted for movement along the ground, elements on the frame to form three parallel furrows with the advancing movement of the frame and means functioning with the advancing movement of the frame and operable at will to alternately form checks in the central furrow and one outer furrow, and then in the central furrow and the other outer furrow.

9. An irrigation checking implement comprising a frame adapted for movement along the ground, elements on the frame to form three parallel furrows with the advancing movement of the frame and means functioning with the advancing movement of the frame and operable at will to alternately form checks in the central furrow and one outer furrow, and then in the central furrow and the other outer furrow, and instrumentalities functioning substantially simultaneous with the check forming means to cut lateral channels between adjacent checked furrows both ahead of and behind the checks.

10. An irrigation checking implement comprising a frame adapted for movement along the ground, elements on the frame to form three parallel furrows with the advancing movement of the frame, a transverse shaft mounted on the frame rearwardly of the elements, check forming plates projecting from the shaft to simultaneously drag in the central furrow and one outer furrow, other similar plates projecting from the shaft in diametrally opposed relation to the first plates and positioned laterally of the implement to simultaneously drag in the central furrow and the other outer furrow, releasable means normally preventing rotation of the shaft from a position such that one pair of plates is in a furrow engaging position and restricting rotation of the shaft to a half turn and instrumentalities functioning during such partial rotation of the shaft to cut channels between that pair of furrows from which the corresponding pair of plates is being withdrawn, both ahead of and behind the checks formed by said pair of plates.

11. An irrigation checking implement comprising a frame adapted for movement along the ground, elements on the frame to form three parallel furrows with the advancing movement of the frame, a transverse shaft mounted on the frame rearwardly of the elements, check forming plates projecting from the shaft to simultaneously drag in the central furrow and one outer furrow, other similar plates projecting from the shaft in diametrally opposed relation to the first plates and positioned laterally of the implement to simultaneously drag in the central furrow and the other outer furrow, releasable means normally preventing rotation of the shaft from a position such that one pair of plates is in a furrow engaging position and restricting rotation of the shaft to a half turn, a single pair of other plates fixed with the shaft in diametrally opposed relation to each other and at right angles to the pairs of checking plates, each of said other plates being arranged relative to one pair of checking plates to cut a lateral channel between the furrows engaged by said pair of checking plates just as the latter leave the furrows with the rotation of the shaft, and other means functioning with said other plates to cut lateral channels adjacent but rearwardly of the checks.

12. A structure as in claim 11, in which said other means comprises another transverse shaft mounted on the frame behind the first named shaft and connected in driving relation thereto for rotation at the same speed, and a pair of diametrally opposed plates fixed on said other shaft in substantial alinement and parallel relationship with the first named channel forming plates, and facing in the same direction.

13. An irrigation checking implement comprising a frame adapted for movement along the ground, a furrow forming element on the frame, means to form checks in the furrow at selected points in the length thereof as said furrow is formed with the movement of the implement along the ground and means mounted with said check forming means to compact the dirt of the checks as the latter are formed.

14. An irrigation checking implement comprising a frame adapted for movement along the ground, a furrow forming element on the frame, means to form checks in the furrow at selected points in the length thereof as said furrow is formed with the movement of the implement along the ground, said means comprising a plate normally depending into the furrow, and a transverse shaft on which said plate is mounted releasably held against rotation and a dirt compacting shoe mounted on the back side of the plate whereby when said shaft is released for rotation through a complete revolution, dirt will first be left beind in the furrow to form a check and such dirt will then be engaged and compacted by said shoe as the shaft completes its revolution with the continued forward movement of the implement.

HUGO PETZOLDT.